United States Patent
Bergqvist et al.

(10) Patent No.: US 6,807,474 B2
(45) Date of Patent: Oct. 19, 2004

(54) METHOD FOR CONTROLLING TORQUE AND A SYSTEM FOR CARRYING OUT THE METHOD

(75) Inventors: Anders Bergqvist, Höviksnäs (SE); Per Anders Mattsson, Hindas (SE)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 10/366,848

(22) Filed: Feb. 14, 2003

(65) Prior Publication Data

US 2003/0225500 A1 Dec. 4, 2003

(30) Foreign Application Priority Data

Feb. 15, 2002 (EP) ............................................. 02445026

(51) Int. Cl.[7] ................................................. G06F 7/00
(52) U.S. Cl. ...................................................... 701/84
(58) Field of Search ................................ 701/51, 52, 54, 701/84

(56) References Cited

U.S. PATENT DOCUMENTS

| | | | |
|---|---|---|---|
| 4,122,732 A | * 10/1978 | Chana | .......................... 477/69 |
| 5,065,319 A | 11/1991 | Iwatsuki et al. | |
| 5,935,042 A | 8/1999 | Thomas et al. | |
| 6,168,546 B1 | 1/2001 | Loffler et al. | |
| 2003/0125161 A1 | * 7/2003 | Tokura et al. | .............. 477/176 |

FOREIGN PATENT DOCUMENTS

| | | |
|---|---|---|
| DE | 10033647 A1 | 1/2002 |
| EP | 0512726 B1 | 12/1995 |
| EP | 1053904 A2 | 11/2000 |
| EP | 0774374 B1 | 12/2001 |

* cited by examiner

*Primary Examiner*—Yonel Beaulieu

(57) ABSTRACT

A method and a system in a vehicle to control the input torque to a drivetrain member (4) connected to an engine (2) is presented. The method comrises the steps of determining (101, 210) a value of the input torque ($T_i$) and determining (101, 210) the rotational speed ($RPM_i$) of an input shaft (6) of the drivetrain member (4). A value of a first torque dependent function ($E_{oi}$) is calculated (105, 106, 206, 207), based on the rotational speed ($RPM_i$), the value of the input torque ($T_i$) and a limit value of the input torque ($T_{Max}$), the value of the input torque ($T_i$) exceeding the limit value of the input torque ($T_{Max}$). If the value of the first torque dependent function ($E_{oi}$) exceeds a predetermined limit value of the first torque dependent function ($E_{oMax}$), the input torque is reduced (109, 212).

11 Claims, 2 Drawing Sheets

METHOD FOR CONTROLLING TORQUE AND A SYSTEM FOR CARRYING OUT THE METHOD

TECHNICAL FIELD

The present invention relates to a method and a system in a vehicle to control the input torque to a drivetrain member connected to an engine, comprising the step of determining a value of the input torque.

BACKGROUND

In vehicle technology it is known to control the torque of a transmission input shaft to reduce the wear of components on the transmission by limiting said torque. U.S. Pat. No. 5,065,319 describes a system for detecting an overtorque state at a vehicle transmission, by comparison of a determined applied torque and an allowable torque. If an overtorque state is detected a signal is outputted to decrease the torque.

A problem with known systems of torque control is that they can cause unwanted limitations in certain driving situations. For example, a heavily loaded passenger car with a trailer may need output torque levels from the drivetrain exceeding a limit level during a short period of time at low speed or stand still situations. Such a situation can arise when starting from the side of a road with a shoulder, in a steep rise.

SUMMARY OF THE INVENTION

An object of the present invention is to provide a method and a system which are adapted to reduce wear of drivetrain components and at the same time provide sufficient torque during a large number of driving situations.

This object is reached by a method and a system in a vehicle to control the input torque to a drivetrain member connected to an engine. The method comprises the steps of determining a value of the input torque, determining the rotational speed of an input shaft of the drivetrain member. A value of a first torque dependent function is calculated, based on the rotational speed, the value of the input torque and a limit value of the input torque, the value of the input torque exceeding the limit value of the input torque. If the value of the first torque dependent function exceeds a predetermined limit value of the first torque dependent function, the input torque is reduced.

Taking the rotational speed of the input shaft along with the torque into consideration when determining the input torque allowed, means that the consideration is based on parameters which together are more accurately linked to the wear of components in the drivetrain member, than what would be the case if only measured torque would be a basis for any decision to limit the torque.

Relating the torque control to the rotational speed of, e.g. The transmission makes it possible to allow high torque in situations where this is needed and it will have a relatively low impact on transmission wear. For instance, in a situation where the vehicle speed is low or zero, a large amount of torque can be needed to take the vehicle out of a difficulty, e.g. a ditch or a steep rise. Taking the low rotational speed in the vehicle drivetrain into account for overtorque control will reduce the risk of the torque being cut to prevent remedy of the situation.

The predetermined limit value of the first torque dependent function, below also referred to as accumulated torque excess function, can, in a structural fatigue perspective, be seen as a partial damage on the drivetrain member, e.g. The transmission. Preferably limit value of the first torque dependent function is taken into account in the design of the drivetrain member, and therefore the method according to the invention gives a predetermined controllable operation of the drivetrain regarding the wear of the transmission.

Preferably, if the value of the first torque dependent function does not exceed the predetermined limit value of the first torque dependent function, the procedure above is repeated to obtain a new higher value of the first torque dependent function. Thus, the torque is allowed the exceed a limit value, but as long as it does so, the closer the value of the first torque dependent function comes to its limit value, where torque is reduced.

Preferably, if the value of the input torque does not exceed the predetermined limit value of the input torque, a value of a second torque dependent function is calculated, based on the value of the input torque, the limit value of the input torque and the rotational speed, and, if the value of the second torque dependent function is lower than a predetermined minimum value of the second torque dependent function, the input torque is not allowed to exceed the predetermined limit value of the input torque. This prevents an allowed overtorque interval to be immediately followed by another overtorque interval, and provides an operational limit that will secure that the overtorque intervals are compensated for to reduce wear of the drivetrain member.

DESCRIPTION OF THE FIGURES

The invention will now be described in greater detail with the aid of the enclosed drawings in which.

DETAILED DESCRIPTION

Figure 1:
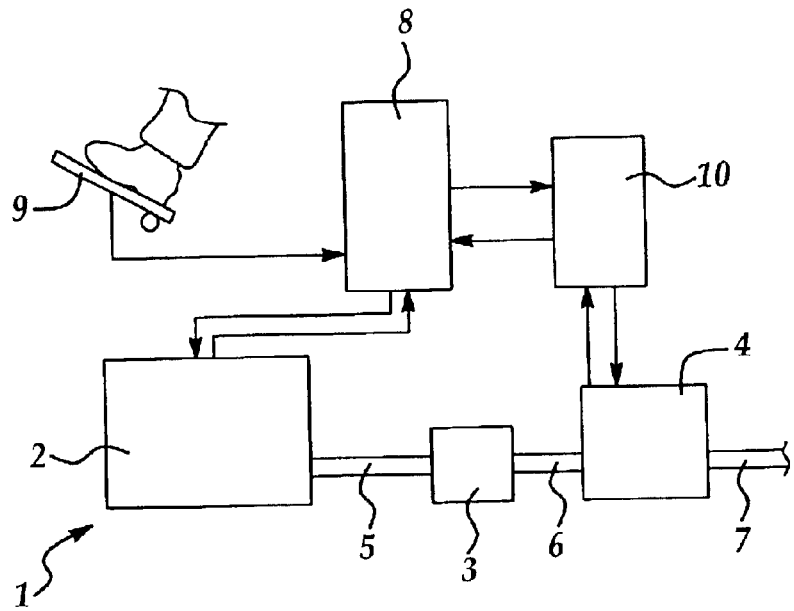
FIG. 1 is a block diagram depicting a vehicle drivetrain and a control system therefore.

FIG. 1 shows schematically a vehicle drivetrain 1 and a control system therefore. The drivetrain comprises an internal combustion engine 2, a fluidic torque converter 3 and a drivetrain member in the form of a hydraulic automatic transmission 4. An engine output shaft 5 drives an input member (impeller, not shown) of the torque converter 3, an output member (turbine, not shown) of the torque converter drives a transmission input shaft 6 and a transmission output shaft 7 drives the wheels of the vehicle for its propulsion.

An Engine Control Module (ECM) 8 is adapted, in a manner known in the art, to receive signals from an accelerator pedal 9, to receive engine condition parameters and to send signals to control the operation of the engine. As is known to the person skilled in the art, the ECM 8 is adapted to determine the engine output torque based on e.g. Air pressure, temperature, and rotational speed.

A drivetrain member control module in the form of a transmission control module (TCM) 10 is adapted to receive, in a manner known in the art, signals corresponding to transmission condition parameters and to send control signals to the transmission 4. Among other parameters the TCM 10 is adapted to receive information about the transmission input and output rotational speed. The TCM 10 is also able to communicate with the ECM 8.

Figure 2:
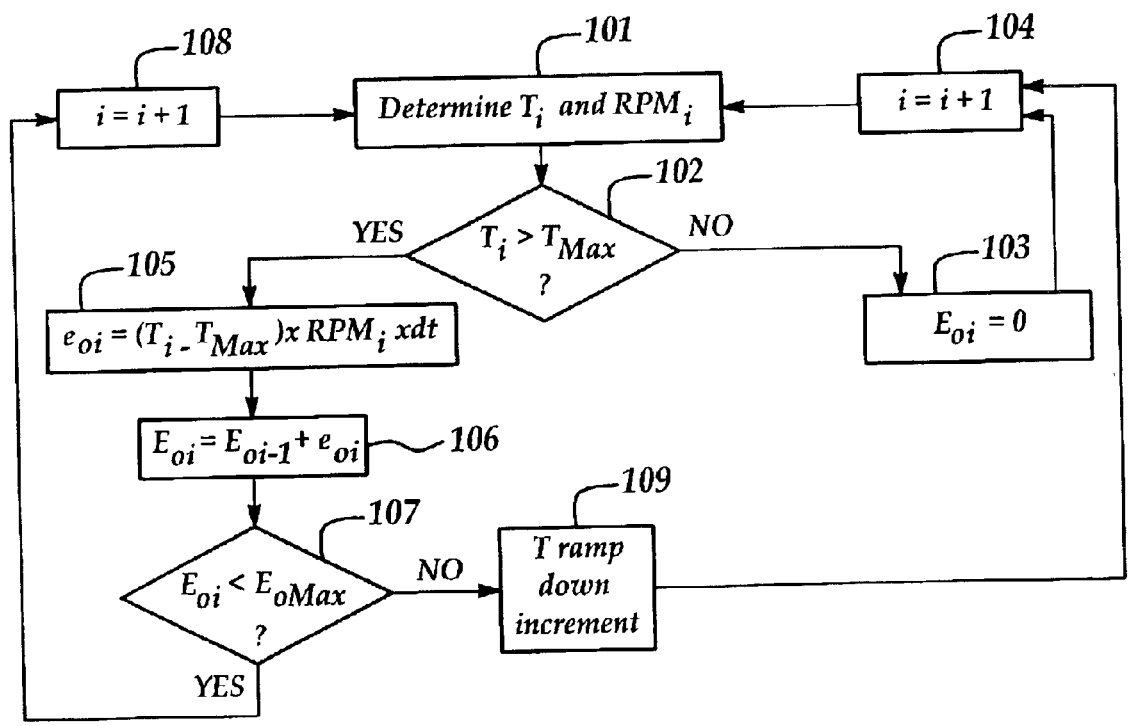
FIG. 2 is a flow chart of a method according to a preferred embodiment of the invention.

A method according to a preferred embodiment of the invention is depicted in the flow chart in FIG. 2. The method involves cyclic sampling of certain drivetrain parameters, and comprises repeatedly, within predetermined time intervals, $\Delta t_i$, each of duration dt, determining a value of the transmission input rotational speed, $RPM_i$, determining a value of the transmission input torque $T_i$, (block 101) and comparing the latter to a predetermined limit value of the transmission input torque $T_{Max}$ (block 102).

As is known in the art, the transmission input rotational speed, $RPM_i$ can be determined by the TCM 10 on the basis of engine output torque information from the ECM 8, the transmission input and output rotational speed and a model of the operational behavior of the torque converter.

Here, we define a first torque dependent function, herein also referred to as an accumulated torque excess function $E_o$, which is dependent on the value of the transmission input torque $T_i$ and which will be explained further below. If it is found that the value of the transmission input torque $T_i$ is lower than the predetermined limit value $T_{Max}$, an initial value of the accumulated torque excess function $E_{oi}$ is set equal to zero (block 103), and new values of the transmission input rotational speed, $RPM_{i+1}$, and the transmission input torque $T_{i+1}$ are determined (blocks 104, 101).

If, for any time interval, $\Delta t_i$, the transmission input torque $T_i$ is larger than the predetermined limit value $T_{Max}$ (block 102), a value of a fractional torque excess parameter $e_o$ is calculated as $e_{oi}=(T_i-T_{Max})\times RPM_i\times dt$ (block 105). Then a new value of the accumulated torque excess function $E_{oi}$ is calculated as $E_{oi}=E_{oi-1}+e_{oi}$ (block 106), where $E_{oi-1}$ is the value of the accumulated torque excess function calculated in connection to the preceding time interval $\Delta t_{i-1}$.

If by the preceding time interval $\Delta t_{i-1}$ the transmission input torque 17, was less than or equal to the predetermined limit value $T_{Max}$, $E_{oi}=E_{oi-1}+e_{oi}=e_{oi}$, since $E_{oi-1}$ was set to zero (block 103).

The value of the accumulated torque excess function $E_{oi}$ is compared to a predetermined limit value $E_{oMax}$ (block 107). If the former is less than the latter the steps taken in the subsequent time interval $\Delta t_{i+1}$ (block 108) correspond to the steps in the one preceding that interval. Thus, if the difference between the transmission input torque and the predetermined limit value, $T_{i+1}-T_{Max}$, is more than zero, a new value of the fractional torque excess parameter is calculated as $e_{oi+1}=(T_{i+1}-T_{Max})\times RPM_{i+1}\times dt$. The new value of the accumulated torque excess function $E_{oi+1}$ is calculated as $E_{oi+1}=E_{oi}+e_{oi+1}$.

Accordingly, during subsequent time intervals, where the transmission input torque is higher than the limit value thereof, the value of the accumulated torque excess function is increased and the value thereof adjusted as $$E_{on} = \sum_{i=1}^{n} e_{oi},$$

for the n:th time interval.

The predetermined limit value of the accumulated torque excess function $E_{oMax}$ can, in a structural fatigue perspective, be seen as a partial damage on the transmission. Preferably $E_{oMax}$ is taken into account in the design of the transmission. The method according to the invention gives an operation of the drivetrain which is connected to fatigue considerations resulting in controllable wear of the transmission.

In an alternative embodiment the comparison of the transmission input torque to its limit value could be omitted, and instead the fractional torque excess parameter $e_o$ could be calculated in each time interval at which, if found that $e_o$ is larger than zero, the value of the accumulated torque excess function could be adjusted as described above.

In a preferred embodiment of the invention the transmission input torque is assigned a predetermined max overload value $T_{UltMax}$, which is higher than the predetermined limit value $T_{Max}$, at which the torque is not allowed to exceed $T_{UltMax}$ in any case, even if the predetermined limit value of the accumulated torque excess function $E_{oMax}$ has not been reached. This assures that the transmission is not subjected to very high momentary loads, or peak loads, which can cause excessive wear, even if the energy of the peak load is lower than the energy corresponding to the limit $E_{oMax}$.

As mentioned above, during each time interval the value of the accumulated torque excess function $E_{oi}$ is compared to the limit value thereof $E_{oMax}$ (FIG. 2, block 107). If it is found that $E_{oi}$ is larger than or equal to $E_{oMax}$, the TCM 10 sends signals to the ECM 8 so as to reduce the transmission input torque. Preferably the signals of the TCM 10 are such that the transmission input torque to time correlation essentially corresponds to a ramp function (block 109). The ramp can be determined so that the torque decreases essentially linearly from the max overload value $T_{UltMax}$ to the limit value $T_{Max}$ during a predetermined ramp time interval. The overload value $T_{UltMax}$ and the ramp time interval should be chosen so that the behavior of the vehicle during the decrease of the torque is experienced as comfortable and smooth to the driver and passengers.

Alternatively the decrease of the transmission input torque can take the form of a non-linear function, or even be stepped down.

The method described above allows the torque to exceed a limit value thereof to enhance the performance of the vehicle during limited overload time periods. The duration of the overload time periods is depends on the amount of torque overload and the rotational speed of the transmission input shaft 6. Using a limit value of the accumulated excess torque function $E_o$ transferred through the transmission input shaft 6 during each overload time period results in foreseeable load cases for the transmission, ensuring that transmission wear is kept within design limitations.

Figure 3:
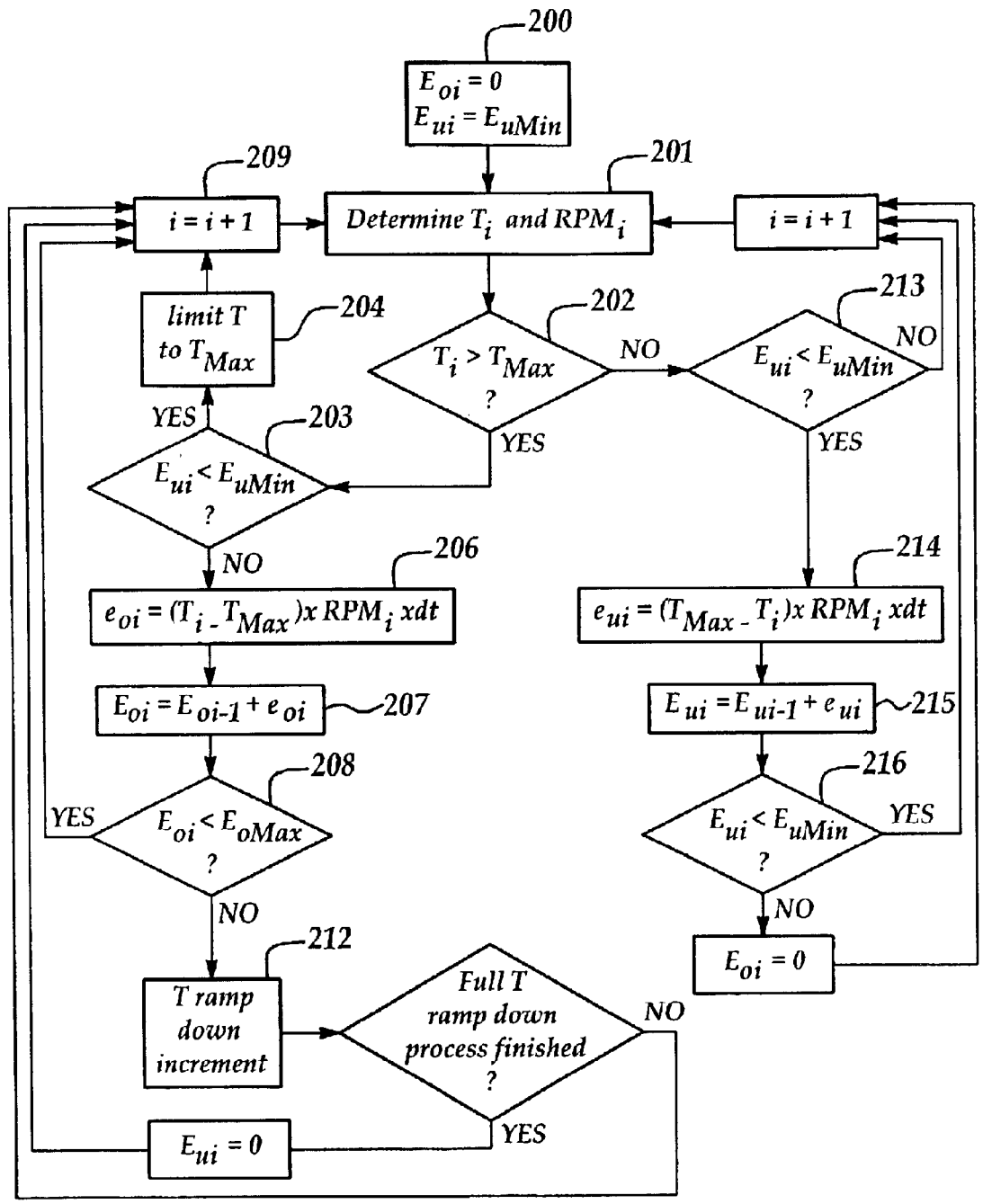
FIG. 3 is a flow chart of a method according to an alternative embodiment of the invention.

The flow chart in FIG. 3 depicts a method according to an alternative embodiment of the invention. Here, the transmission input torque is not allowed to exceed the limit value $T_{Max}$ until a second toque dependent function, herein also referred to as an accumulated sub-torque function $E_u$ has reached a predetermined minimum value $E_{uMin}$. One can say that this function serves the purpose of giving the transmission a chance to "recover" before the next overload time period.

The accumulated sub-torque function $E_u$ is calculated similarly to the accumulated torque excess function $E_o$ described above. If, for any time interval the momentary transmission input torque $T_i$ is larger than or equal to the predetermined limit value of the input torque $T_{Max}$ (block 201, 202) the accumulated sub-torque function $E_{ui}$ is compared to the minimum value $E_{uMin}$ (block 203). If it is found that $E_{ui}$ is smaller than $E_{uMin}$, T is limited to $T_{Max}$ (block 204), by control of the ECM 8.

If it is found that $E_{ui}$ is equal or larger than $E_{uMin}$, $E_{uMin}$ is set to 0 (block 205) and overtorque is allowed. Thereby steps according to blocks 206–208, corresponding to blocks 105–107 (see above) is FIG. 2 are performed. If $E_{oi}$ is less than $E_{oMax}$ (block 208), then in the subsequent time interval $\Delta t_{i+1}$ (block 209), if the transmission input torque $T_{i+1}$ is larger than the predetermined limit value $T_{Max}$ (block 210, 211), a new value of the fractional torque excess parameter is calculated as $e_{oi+1}=(T_{i+1}-T_{Max})\times RPM_{i+1}\times dt$ (block 206), and so on. When $E_{oi}$ is larger than or equal to $E_{oMax}$ (block 208) the torque is ramped down (block 212), (see above).

For any time interval, if the transmission input torque $T_i$ is less than the predetermined limit value $T_{Max}$ (block 202 or 211), the accumulated sub-torque function $E_{ui}$ is compared to the minimum value $E_{uMin}$ (block 213). If it is found that $E_{ui}$ is smaller than $E_{uMin}$ (and $T_i$ is smaller than $T_{Max}$), a value of a fractional sub-torque parameter $e_u$ is calculated as $e_{ui}=(T_{Max}-T_i)\times RPM_i\times dt$ (block 214). Then a new value of the accumulated sub-torque function $E_{ui}$ is calculated as $E_{ui}=E_{ui-1}+e_{ui}$ (block 215), where $E_{ui-1}$ is the value of the accumulated sub-torque function calculated in connection to the preceding time interval.

Again, $E_{ui}$ is compared to $E_{uMin}$ (block 216). If $E_{ui}$ is smaller than $E_{uMin}$, then, within the subsequent time interval, $T_i$ is compared to $T_{Max}$ (blocks 217–219). If $T_i$ is smaller than $T_{Max}$, a new value of the fractional sub-torque parameter $e_{ui}$ is calculated (block 214).

Accordingly, where the transmission input torque is lower than the limit value thereof, the value of the accumulated sub-torque function is increased and the value thereof adjusted as $$E_{un} = \sum_{i=1}^{n} e_{ui},$$

for the n:th time interval. During each time interval the value of the accumulated sub-torque function $E_u$ is compared to the minimum value thereof $E_{uMin}$. If it is found that $E_u > E_{uMin}$ (block 216), the TCM 10 sends a signal to the ECM 8 so as to once again allow transmission input torque above the predetermined limit value $T_{Max}$.

In a further alternative embodiment the comparison of the transmission input torque to its limit value could be omitted, and instead the fractional sub-torque parameter $e_u$ could be calculated in each time interval, at which, if found that $e_u$ is larger than zero, the value of the accumulated sub-torque function $E_u$ could be adjusted as described above.

Above, control of the input torque to a transmission has been described. However, the invention can also be used in connection to other vehicle drivetrain members. In four-wheel drive vehicles the method can be used to control the input torque of an angle gear or a final gear. Also, instead of being applied to an automatic transmission combined with a torque converter, the method can be used to control the input torque of a manual transmission connected directly to the engine.

In the example above, referring to FIG. 2, values of the accumulated torque excess function, also referred to as the first torque dependent function, are calculated as $$E_{on} = \sum_{i=1}^{n} (T_i - T_{Max}) \times RPM_i \times dt,$$

for the n:th time interval. As an alternative the first torque dependent function $E_{on}$ can be calculated on the basis of values of a function of the rotational speed. This function could be the input power $P_i$ to the drivetrain member 4. The input power is calculated as $P_i=T_i\times RPM_i$. As an example, values of the first torque dependent function is then calculated as $$E_{on} = \sum_{i=1}^{n} (P_i - T_{Max} \times RPM_i) \times dt,$$

for the n:th time interval, (which equals $$E_{on} = \sum_{i=1}^{n} (T_i - T_{Max}) \times RPM_i \times dt,$$

expressed above).

What is claimed is:

1. A method for controlling input torque to a transmission coupled to an engine, the method comprising:

(a) determining a value of the input torque to the transmission;

(b) determining a rotational speed of an input shaft of the transmission;

(c) calculating a first torque control value based on the rotational speed, the input torque value and an input torque limit value; and (d) reducing the input torque when the first torque control value exceeds a predetermined limit value.

2. The method of claim 1 further comprising repeating steps (a)–(c) to obtain a new first torque control value when the first torque control value, does not exceed the predetermined limit value.

3. The method of claim 1 further comprising limiting the input torque to a predetermined maximum overload torque value that is higher then the predetermined limit value.

4. The method of claim 1 further comprising calculating a value of a rotational speed dependent function, based on the input torque value and the rotational speed, wherein the first torque control value is calculated bend on a value of a rotational speed dependent function and the input torque limit value.

5. A method for controlling input torque to a transmission coupled to an engine, the method comprising:

(a) determining a value of the input torque to the transmission;

(b) determining a rotational speed of an input shaft of the transmission;

(c) calculating a second torque control value based on the rotational speed, the input torque value, and the input torque limit value; and (d) limiting the input torque to the input torque limit value when the second torque control value is lower than a predetermined minimum value.

6. A system for controlling input torque to a transmission coupled to an engine, the system comprising:

a drivetrain control device configured to determine a transmission input torque value and the rotational speed of a transmission input shaft, said device further configured to calculate a first torque control value based on the rotational speed, the input torque value and an input torque limit value, said device being further configured to reduce the input torque when the value of the first torque control value exceeds a predetermined limit value.

7. The system of claim 6 wherein said drivetrain control device includes an engine control module communicating with a transmission control module.

8. The system of claim 6 wherein said drivetrain control device is further configured to determine a new input torque value and a new rotational speed value, and to calculate a new first torque control value when the value of the first torque control value does not exceed the predetermined limit value.

9. The system of claim 6 wherein the transmission include, a torque converter connected to the engine.

10. The system claim 6 wherein said transmission comprises one of an automatic transmission or a manual transmission.

11. A system fur controlling input torque to a transmission coupled to an engine, the system comprising:

a drivetrain control device configured to determine a transmission input torque value and a rotational speed of an transmission input shaft, said device further configured to calculates second torque control value based on the rotational speed, the input torque value and an input torque limit value, said device being further configured to limit the input torque when the second torque control value is lower than a predetermined minimum value.

* * * * *